US005755527A

United States Patent [19]

Dufresne

[11] Patent Number: 5,755,527

[45] Date of Patent: May 26, 1998

[54] ROADWAY WATER RAMP APPARATUS

[76] Inventor: Peter Dufresne, 4422 W. Keating Cir., Glendale, Ariz. 85308

[21] Appl. No.: 715,154

[22] Filed: Sep. 17, 1996

[51] Int. Cl.[6] .................................. F16L 1/06; F16L 3/08

[52] U.S. Cl. ................................ 404/3; 404/15; 138/105; 138/106; 405/157

[58] Field of Search .................................. 14/69.5; 404/3, 404/15, 16; 405/157; 138/103, 105, 106, 110, 115–117

[56] References Cited

U.S. PATENT DOCUMENTS

| | | | |
|---|---|---|---|
| 374,348 | 12/1887 | Cook | 138/116 |
| 1,736,923 | 11/1929 | Lalonde . | |
| 1,849,421 | 3/1932 | Dyer | 404/3 |
| 4,374,530 | 2/1983 | Walling . | |
| 5,217,319 | 6/1993 | Klohn | 404/15 |
| 5,267,367 | 12/1993 | Wegmann, Jr. . | |
| 5,353,843 | 10/1994 | Hoag . | |
| 5,385,431 | 1/1995 | Topf, Jr. | 138/105 X |

FOREIGN PATENT DOCUMENTS

| | | | |
|---|---|---|---|
| 104986 | 11/1937 | Australia . | |
| 530667 | 6/1939 | United Kingdom . | |
| 1327659 | 9/1971 | United Kingdom . | |
| 2086967 | 5/1982 | United Kingdom | 404/16 |

*Primary Examiner*—James Lisehora
*Attorney, Agent, or Firm*—H. Gordon Shields

[57] ABSTRACT

Ramp apparatus conveying water across a thoroughfare includes a pair of ramp elements spaced apart from each other with a liquid carrying element disposed between them. The ramp elements and the liquid carrying element are secured together as an integral unit, and coupling elements are disposed in opposite ends of the ramp for coupling to hoses, etc. The apparatus is designed to be disposed across the thoroughfare, and accordingly has a relatively low profile for ease of traffic problems as traffic moves over the ramp apparatus and at the same time is able to carry a substantial amount of fluid or liquid, such as water, from one side of the thoroughfare to the other side.

4 Claims, 2 Drawing Sheets

ROADWAY WATER RAMP APPARATUS

BACKGROUND OF THE INVENTION

1. Field of the Invention

This invention relates to transporting water across a road and, more particularly, to a ramp apparatus with integral water carrying chambers therein.

2. Description of the Prior Art

U.S. Pat. No. 1,736,923 (LaLonde) discloses a hose coupling and a hose for supplying both water and oxygen for firemen. The hose comprises a pair of concentric hoses with water being conveyed in the inner hose and oxygen conveyed between the outer and inner hoses. The particular coupling disclosed allows lengths of the concentric hoses to be connected together.

U.S. Pat. No. 4,374,530 (Walling) discloses flexible tubing used in well production. The tubing includes a flexible external shell and a resilient core within the shell, with a plurality of conduits within the resilient material. The tubing is segmented so as to be easily wound about a reel for transporting to and from a well site. The configuration of the apparatus is generally rectangular.

U.S. Pat. No. 5,267,367 (Wegmann, Jr.) discloses a safety ramp for protecting hoses in conduits. The ramp includes a channel running lengthwise in which is disposed a hose.

U.S. Pat. No. 5,353,843 (Hoag) discloses a protective jacket in which a hose may be disposed. The protective jacket is segmented, to allow the jacket, and the hose disposed therein, to curve or bend, as required.

Australian Patent 104,986 discloses a hose bridge for protecting a hose.

British Patent 530,667 also discloses a hose bridge. The two hose bridges are structurally different, but both provide the function of protecting a hose.

British Patent 1,327,659 discloses protective bumpers disposed about a flexible hose for protecting the hose from traffic.

Of the above discussed patents, the Wegmann '367, the Hoag '843, and the Australian and British '667 patent all deal with the protection of hoses from traffic. The Lalonde patent is concerned with the flow of two fluids, water and oxygen, in a hose, and the Walling '530 patent is concerned with flexible tubing used in wells. The British '659 patent is concerned with the protection of a flexible hose in situations where there is relative movement in the hoses or lines, such as hydraulic brake fluid lines, etc.

The apparatus of the present invention is concerned with the transmission of a fluid, such as water, across a street or thoroughfare during construction, and the like, where traffic moves along the street or thoroughfare. The present apparatus includes an integral ramp and fluid carrying elements and which protects both the fluid as it is being transported, and vehicular traffic moving along the street or thoroughfare.

SUMMARY OF THE INVENTION

The invention described and claimed herein comprises a double ramp with integral fluid carrying elements extending the length of the ramp. The term "double ramp" simply means that one side of the apparatus includes an up ramp and the opposite side includes a down ramp for traffic moving in both directions. The center section of the apparatus, or the portion between the two ramps, includes tubing through which liquid, such as water, flows. The ends of the ramp elements include connections for hoses. The ramp elements may be made in virtually any length, or a plurality of the ramp elements may be appropriately secured together to provide a ramp of a desired length.

Among the objects of the present invention are the following:

To provide new and useful apparatus for transporting water across a thoroughfare;

To provide new and useful apparatus including an integral ramp and fluid carrying element for transporting a fluid;

To provide new and useful fluid carrying element including a double ramp to be disposed across a thoroughfare; and To provide new and useful ramp apparatus having an integral fluid carrying capacity therethrough.

DESCRIPTION OF THE PREFERRED EMBODIMENT

Figures 1, 2, 3, 9, 10:
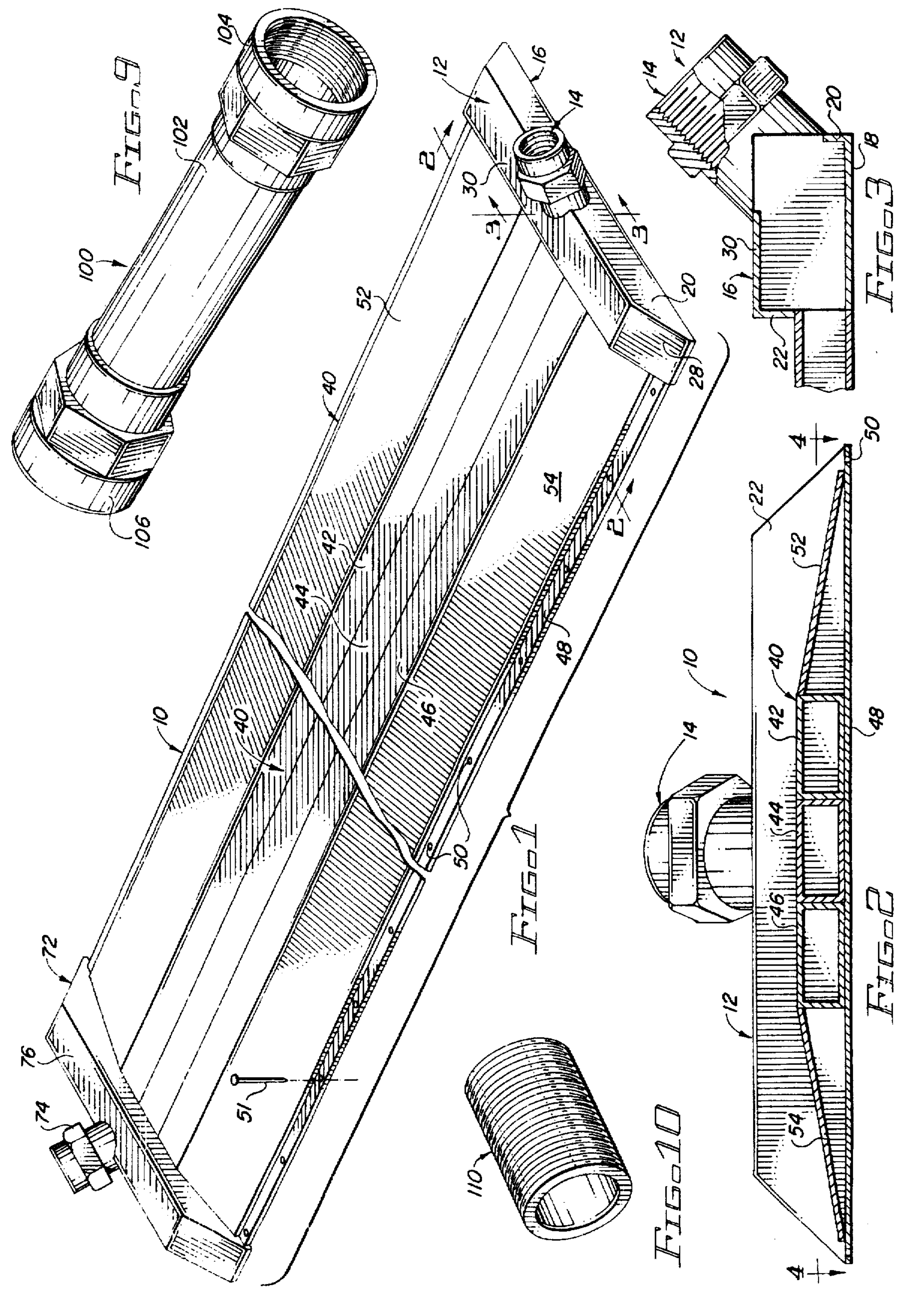
FIG. 1 is a perspective view of the apparatus of the present invention.
FIG. 2 is a view in partial section taken generally along line 2—2 of FIG. 1.
FIG. 3 is a view in partial section taken generally along line 3—3 of FIG. 1.
FIG. 9 is a perspective view of an adapter usable with the apparatus of the present invention.
FIG. 10 is a perspective view of another adapter usable with the apparatus of the present invention.
Figure 4:
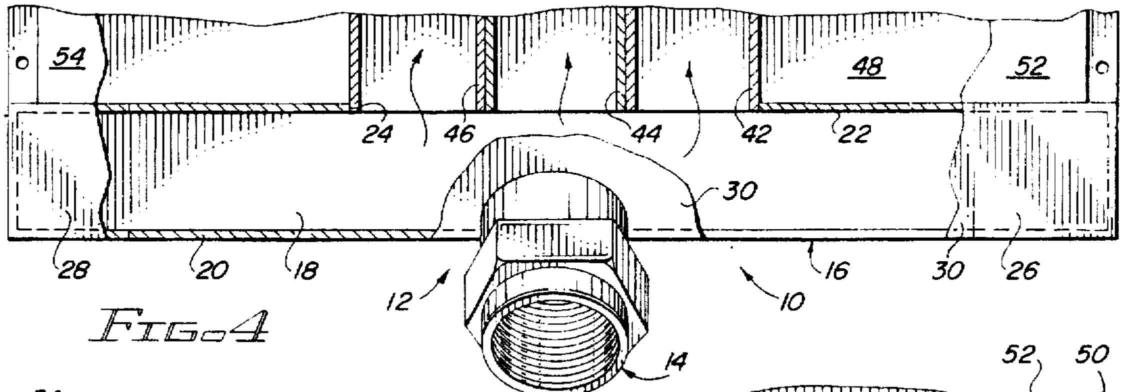
FIG. 4 is a view in partial section taken generally along line 4—4 of FIG. 2.

FIG. 1 is a perspective view of roadway water ramp apparatus 10 of the present invention. FIG. 2 is a view in partial section of the apparatus 10 of FIG. 1 taken 10 generally along line 2-2 of FIG. 1. FIG. 3 is a view in partial section taken generally along line 3—3 of FIG. 1. FIG. 4 is a view in partial section taken generally along line 4—4 of FIG. 2. For the following discussion, reference will primarily be made to FIGS. 1, 2, 3, and 4.

Apparatus 10 includes a first connector header 12 and a second header connector 72 spaced apart from each other and connected by a central water carrying tubing portion 40. For convenience, the header 12 may be referred to as a connector or input header, and the header 72 may be referred to as a discharge header. Thus, water flows through the central tube portion 40 from the connector header 12 and from the central tubing portion 40 outwardly through the discharge header 72. The two headers, the header 12 and the header 72, are substantially identical to each other.

The connector header 12 includes an internally threaded hose connector 14 secured to a manifold 16. The manifold 16 includes a bottom plate 18, a front plate 20, a rear plate 22, a pair of side plates 26 and 28, and a top plate 30. The rear plate 22 includes an opening 24 which communicates with the tubing portion 40.

From FIG. 1, it is apparent that the front plate 20 is of a generally trapezoidal configuration. The top plate 30 is generally rectangular in configuration, as are the side plates 26 and 28. The rear plate is also of a generally trapezoidal configuration. The bottom plate 18 is generally of a generally rectangular configuration. The respective plates are appropriately secured together. The internally threaded hose connector 14 extends at an angle outwardly from the manifold 16, and as appropriately secured to both the front plate 20 and the top plate 30.

The central water carrying tubing portion 40 includes three tubular members, a tube or conduit 42, and a tube or conduit 44, and a tube or conduit 46. The three tubes 42,44, and 46 are appropriately secured to each other and are disposed on a bottom plate 48. The three tubes 42, 44, and 46 are centrally located relative to the bottom plate 48. The bottom plate 48 accordingly extends outwardly a substantial distance from the three tubular elements. At the outer periphery of the bottom plate 48 there are holes or apertures 50 which may be used to secure the apparatus 10 on a roadway, if necessary or if desired. Appropriate fastening elements, such as pikes or nails 51, etc., may be inserted through the apertures 50 to secure the apparatus 10 to a roadway.

A pair of ramp plates 52 and 54 are also appropriately secured to the bottom plate 48 and extend from the bottom plate 48 to the outer tube elements 42 and 46, respectively. The ramp plates 52 and 54 allow a vehicle to roll over the apparatus 10 in a very convenient manner. The ramp plates 52 and 54 are secured to the bottom plate 48 inwardly form the apertures 50.

The height of the apparatus is preferably slightly over an inch (2.54 cm), and with the ramps 52 and 54, a vehicle may pass over the apparatus 10 with a minimum of inconvenience with respect to traffic and, obviously, with no practical effect on water flowing through the apparatus 10.

As best shown in FIG. 4, water from the header 12 is directed into the tubes 42, 44, and 46 through the opening 24 in the back plate 22. The back plate 22 prevents water from flowing beneath the ramp plates 52 and 54. Opening 24 is an aperture through the back plate 22 to provide communication between the manifold 16 and the three tubular elements 42, 44, and 46.

Figure 5:
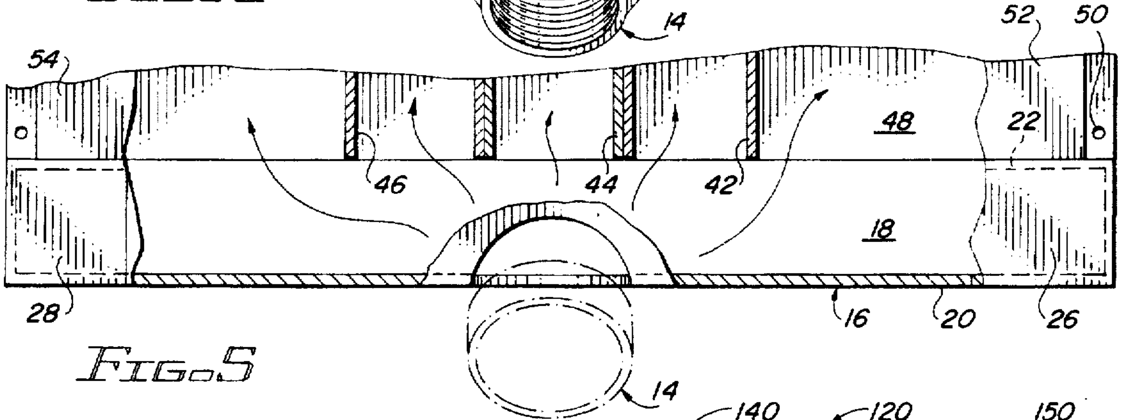
FIG. 5 is a perspective view of an alternate embodiment of the apparatus of the present invention.

If a greater flow of water is required than what may conveniently be carried through the tubular elements 42, 44, and 46, the entire apparatus may be used to convey water between the two headers. This is illustrated in FIG. 5. As shown in FIG. 5, the opening 24 in the back plate 20 is enlarged from that shown in FIG. 4 to allow for water to flow from the header 16 to flow beneath the ramp plates 52 and 54 as well as through the tubular elements 42, 44, and 46. Thus, the bottom plate 48 becomes the bottom of two additional conduits defined with the respective ramp plates 52 and 54 and the outer tubular elements 42 and 46 through which water flows between the two headers 16 and 72.

The discharge header 72, as indicated above, is substantially identical to the connector header 12. The header 72 includes an internally threaded hose connector 74 and a manifold 76.

It will be noted that the hose connectors 14 and 74 are both internally threaded and may include wrench ports for securing them to externally threaded hoses. The internal threads inherently receive a degree of protection, while external threads are inherently subject to damage.

The roadway water ramp apparatus 10 may be made in any convenient or desired length. It has been found that a length of about twenty eight feet (9.8 meters) is generally convenient for both new construction areas and established neighborhood streets.

Figure 6:
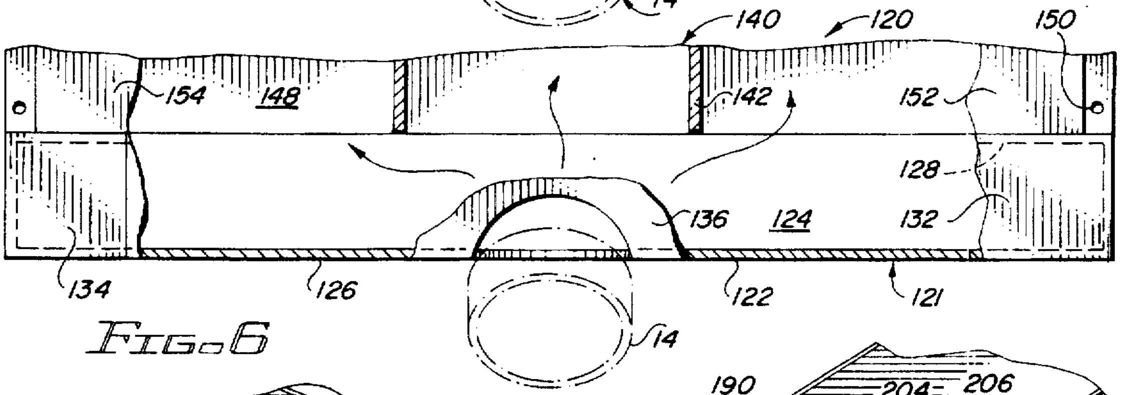
FIG. 6 is a perspective view of another alternate embodiment of the apparatus of the present invention.

Under some circumstances, only a single center conduit may be required. Such is shown in FIG. 6, which comprises a view in partial section of a header 120 secured to a center conduit 140. The header 120 includes the internally threaded hose connector 14 secured to a manifold 122.

The manifold 122 includes a bottom plate 124, a front plate 126, a rear plate 128, a pair of side plates 132 and 134, and a top plate 136.

The center conduit 140 is centrally dispose on a bottom plate 148. At the outer periphery of the bottom plate 148, outwardly from the center conduit 140 and from a pair of ramp plates 152 and 154, are apertures 150. The apertures 150 are used, substantially as discussed above, for securing the apparatus to a roadway.

The ramp plates 152 and 154 are appropriately secured to both the bottom plate 148 and the single center conduit 140.

The rear plate 128 of the manifold 122 includes an opening which provides communication for water flow from the manifold 122 not only the center conduit 140, but also to the generally triangularly configured areas beneath the ramp plates 152 and 154, the bottom plate 148, and the sides of the conduit 140. Again, the overall height of the apparatus illustrated in FIG. 6 if preferably slightly over an inch (2.54 cm.), and the length may be as desired, again typically about 28 feet (9.8 meters).

Figure 7:
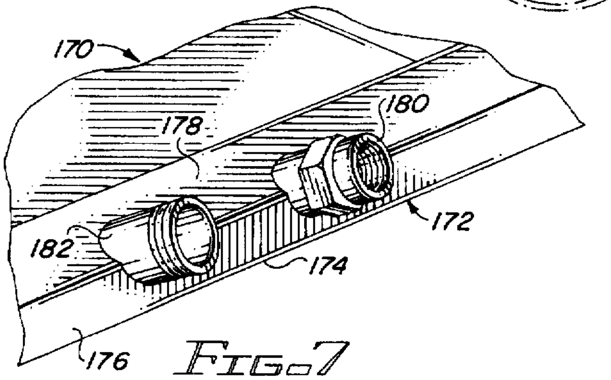
FIG. 7 is a perspective view of another alternate embodiment of a portion of the apparatus of the present invention.

FIG. 7 is a perspective view of an alternate embodiment of the apparatus of the present invention, comprising roadway water ramp apparatus 170. Only a portion of the apparatus 170 is illustrated in FIG. 7. The portion illustrated includes a header 172, which includes a manifold 174 and a pair of hose connectors 180 and 182. The manifold 174 includes a front plate 176 and a top plate 178. The hose connectors 180 and 182 are appropriately secured to the front plate 176 and top plate 178 in the manner substantially as discussed above and as illustrated in conjunction with FIGS. 1, 2, 3, 4, 5, and 6.

The hose connector 180 is internally threaded, substantially identical to the hose connectors 14 illustrated and discussed above. The hose connector 182 is externally threaded. Thus, the apparatus 170 may be connected to either an externally threaded hose or an internally threaded hose. Obviously, an appropriate plug or cap will close the unused hose connector. Such elements are well known and understood in the art, and are accordingly are not illustrated.

Figure 8:
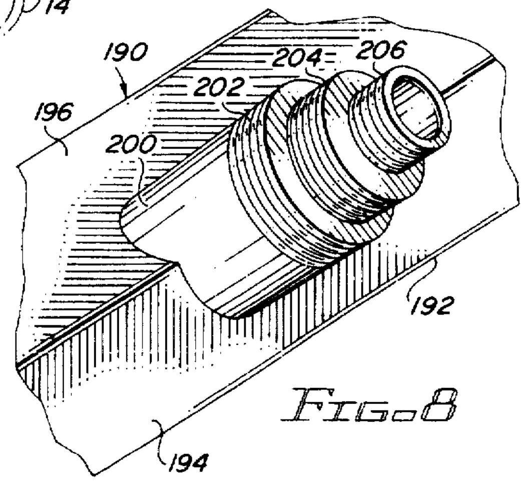
FIG. 8 is a perspective view of another alternate embodiment of a portion of the apparatus of the present invention.

FIG. 8 comprises a perspective view of a portion of a header 190, which comprises another alternate embodiment. The header 190 includes a manifold 192 and a hose connector 200. The manifold 192 includes a front plate 194 and a top plate 196. Again, the hose connector 200 is appropriately secured to the front plate 194 and the top plate 196. The hose connector 200 includes three different externally threaded portions so as to enable the header 190 to be connected to hoses of different sizes. The hose connector 200 includes a maximum diameter externally threaded portion 202, a medium diameter externally threaded portion 204, and a small or minimum externally threaded portion 206. Thus, for example, a garden hose may be connected to the minimum diameter portion 206, a two-inch hose may be connected to the medium diameter portion 204, and a four-inch hose may be connected the maximum diameter portion 202. This allows the header 190, and the conduit portion to which it is secured (not shown) to be connected to any available and appropriate source of water.

FIG. 9 comprises a perspective view of a hose adapter 100 which may be used, for example, to connect two water ramp apparatus together. The adapter 100 includes a flexible central conduit 102 extending between a pair of connector elements 104 and 106. The connector elements 104 and 106 are illustrated as being internally threaded, but they may also be externally threaded, if desired. Or, in the alternative, one end portion may be externally threaded and the other end portion may be internally threaded.

FIG. 10 comprises a perspective view of an adapter nipple 110. The adapter nipple 110 is shown as being externally threaded. The nipple 110 would be used, for example, to connect the internally threaded hose connector 14 to the adapter 100 or to connect the hose connector 14 to an internally threaded connector of a hose.

The present invention is fabricated out of appropriate material, such as steel, and accordingly the apparatus virtually indestructible with regard to ordinary vehicular traffic and also to the traffic of construction equipment of various kinds. The use of the ramps, along with the relatively low profile of the entire apparatus, allows traffic to continue with minimum, if any, slowing under normal circumstances in both new construction areas as well as in developed, hard surface roadway areas. Furthermore, the ramps may be secured in place to help insure minimum, if any, problems with moving traffic.

At the same time, and regardless of the specific surface on which the apparatus is disposed, water flows freely through the apparatus without regard to the traffic. Moreover, different water flows may be provided for, depending on whether only the center, tubular, section carries the water or whether the ramp portions also are used to carry the water. The variations in the specific design, but using the same general profile, thus provide great flexibility in practical use.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Ramp apparatus for conveying a liquid across a thoroughfare comprising in combination:

a base plate;

a first tube secured to the base plate for conveying a liquid;

a first ramp secured to the base plate and to the first tube;

a second tube secured to the base plate for conveying the liquid;

a second ramp secured to the base plate and to the second tube;

a first header secured to the base plate, the first tube, and to the second tube through which the liquid flows to the first and second tubes; and first connector means secured to the header for conveying the liquid to the header.

2. The apparatus of claim 1 which further includes a second header secured to the base plate and the first and second tubes remote from the first header for receiving the liquid from the first and second tubes.

3. The apparatus of claim 2 which further includes second connector means secured to the second header.

4. The apparatus of claim 1 which further includes a plurality of apertures spaced apart from each other extending through the base plate for receiving fastener elements for securing the ramp apparatus to the thoroughfare.

* * * * *